2,926,089

METHOD OF TENDERING AND FLAVORING MEAT

Beverly E. Williams, Hillsborough, Calif., assignor to Hodges Research and Development Company, New York, N.Y., a corporation of California No Drawing. Application June 30, 1958
Serial No. 745,300

7 Claims. (Cl. 99—107)

This invention relates to methods for accelerating the tendering and flavoring and improving the color of meat and more particularly to methods for the production of tenderized, flavorized ripened beef.

In my Patent No. 2,816,836 of December 17, 1957, I have described methods for aging and tendering beef under the there specified conditions of temperature and humidity during which aging processes Thamnidium is introduced into the space where the meat is being aged. As described in my patent, introduction of Thamnidium throughout the space containing the meat being aged minimizes bacterial growth and sliming while imparting a black walnut taste to the meat which is characteristic of carefully and properly aged meat without loss of color quality of the beef. At the high humidities employed shrink loss is at a minimum and trim loss is reduced to a negligible quantity. In the processes of my patent the meat is aged at temperatures from 45° F. to 60° F. and at relative humidities greater than 80%.

In regard to flavor, most people associate aged flavor with the bacterial taint of long "hung" meat. This flavor is preferred by some if it is not too distinct but is not preferred if it is too dominant. If there is too much "aged flavor," it is often called "high," "off flavor," or "tainted." The younger generation is not used to this flavor and does not like it. It is acceptable, not in the home, but in night clubs preceded by drinks.

Thamnidium, on the other hand, does not contribute to the so-called "aged flavor." Thamnidium combats and slows down bacterial activity, both in the air, and on and within the meat, and contributes to the bringing out of the meat flavor. In other words, a control sample would be voted bland, while a Thamnidium sample would be voted to have a good meat flavor—rich, mellow, well bodied, etc. The meat tastes like fresh meat rather than aged meat but of a full grade or two higher quality. The temperature cycle also elevates the quality a grade or two, so that a U.S. Good loin processed in accordance with the present concept would be voted superior in tenderness and flavor to a U.S. Choice hung for the same period in a regular cooler. The two would be given split votes if the U.S. Choice were hung twenty-one days versus the U.S. Good in accordance with the present concept, some preferring one and some the other; but the present invention elevates meat one or more full grades.

I have now found that the time required for properly tendering and ripening beef under controlled conditions of temperature and humidity when Thamnidium is introduced into the space containing the meat, may be substantially reduced to not more than 48 hours, if a cycling of temperature during the aging of meat is employed. More specifically, I have now found that beef can be properly ripened and tendered, with improved color in approximately 48 hours if, after rigor mortis, the beef is introduced at a temperature of approximately 35° F. into the meat ripening space having airborne Thamnidium where the temperature of the meat is raised to approximately 60 to 75° F. in less than 8 hours; then held at temperatures of approximately 65 to 75° F. for 32 hours or more; and then reduced to approximately 32 to 35° F. in less than 8 hours. During the meat ripening cycle the relative humidity is maintained above 90% and up to 100% saturation including super-saturation for all or part of the time cycle. During the cooling portion of the cycle the air in the meat ripening space is sterilized to provide a sterile atmosphere in the meat ripening space to kill or inhibit the growth of undesirable mold and bacteria in the atmosphere.

During the cycling of temperature described above the air in the space where the chilled meat is being ripened increases in temperature to approximately 70°–75° F. in 4 hours or more depending upon the meat load and during the cooling cycle decreases in temperature from approximately 70°–75° F. to approximately 33–35° F. in approximately 4 hours, more or less, depending upon the meat load or volume of meat to volume of air space.

Thamnidium may be introduced both during the heating cycle of approximately 8 hours and during the holding cycle of approximately 36 hours. The presence of Thamnidium controls bacterial action even at the relatively high temperatures used and prevents spoiling and actually improves and brightens the red color of the beef. It is preferred to introduced the Thamnidium periodically into the meat aging space, as described in my patent, and the Thamnidium is preferably introduced as by spraying in a glycerol suspension from an "Aerosol" type bomb. The same timing mechanism that times the heating, holding, and cooling cycle in the meat ripening space may also be employed to periodically actuate the atomizer for the Thamnidium. Other means for introducing the Thamnidium into the meat aging space can be employed. For example, Thamnidium which will become airborne may be dispersed in sawdust and the sawdust scattered on the floor of the meat ripening space. Other suitable means for introducing the Thamnidium into the air of the meat ripening space will be obvious to those skilled in the art.

In view of the relative shortness of time during which the Thamnidium is active in the processes of the present concept, approximately 44 hours, practically no mold appears on the surface of the meat since about four days are required for the hyphae or whiskers of the mold to appear on the surface of the meat. However, the mycelia of the mold grow into the meat during the entire cycle enhancing the flavor of the meat in the manner described in my patent. Thamnidium, by inhibiting bacterial activity which causes darkening of meat, actually contributes to the brightening of the red color, myoglobin, of the meat.

As noted above, during the cooling cycle of approximately 4 to 8 hours the atmosphere within the meat ripening space is sterilized to destroy bacteria in the atmosphere which are deleterious to the meat. This sterilizing action is preferably continued until the end of the meat ripening cycle; until removal of the meat from the ripening space; and until the ripening space is again filled with meat to be ripened. Thus, at the commencement of the ripening cycle the air in the ripening space is substantially sterile. Various means may be employed for sterilizing the air in the ripening space during the cooling cycle and both mechanical means and/or chemical sprays may be employed. For example, electrostatic precipitation may be employed; and/or propylene glycol or tributyl tin oxide may be sprayed periodically into the ripening space. Here again, the timing mechanism employed to regulate the meat ripening cycle may be employed to periodically spray the chemical sprays into the meat ripening space during sterilization of the atmosphere; or may be employed to actuate the electrostatic precipitator; or actuate combinations thereof.

As used above, the term "Thamnidium" is to be understood as including the class of molds referred to as Phycomycetes, in the order of Mucorales and in the family of Mucoraceae. Several strains of Thamnidium have been identified and the term "Thamnidium" includes any one or more of these strains or mutations thereof or hybrids thereof and expressly includes *Thamnidium elegans* and *Thamnidium-anomalum*.

Tests conducted on cuts of beef aged, that is, tendered and flavored in accordance with the processes above described when compared with companion control cuts aged by present commercially acceptable methods show that U.S. Choice beef aged according to the present invention averages 10 to 20% more tender and of better flavor than control; U.S. Good beef averages 20 to 40% better than control; U.S. Commercial beef averages 30 to 50% better than control; and U.S. Utility beef averages 40 to 50% better than control.

The high humidity employed during the aging or ripening cycle may be obtained by any suitable known means such as, for example, by the use of a bath of heated water in the meat aging space.

It should now be apparent to those skilled in the art that I have provided novel processes for aging or ripening beef and improving the tenderness, color and flavor thereof which in every way satisfy the objectives described above for aging and tendering beef in approximately 48 hours as compared to up to 21 days now required, in which the loss, by reason of trim and shrink, is reduced to a minimum while the taste, quality and appearance of the meat are enhanced.

Changes may be made in the above described processes as by varying the temperature and humidity conditions and by varying the duration of the period of the cycle without departing from the present inventive concept. Reference should therefore be had to the appended claims to determine the scope of this invention.

What is claimed is:

1. In a method for aging and ripening meat to improve its tenderness, color and flavor the steps of introducing the beef, after rigor mortis has been completed, into an enclosed space and increasing the temperature of the meat in the enclosed space to approximately 70 to 75° F., then maintaining the temperature of the meat and of the enclosed space at approximately 70° F. to 75° F. for approximately 36 hours; periodically introducing Thamnidium into the enclosed space during both the heating and holding periods; then reducing the temperature of the meat to approximately 33 to 35° F.; periodically sterilizing the atmosphere within the enclosed space during the cooling period; and maintaining the relative humidity of the atmosphere within the enclosed space at above approximately 90% during the ripening cycle whereby the beef becomes properly aged or ripened and improved in tenderness and flavor within an approximate 48 hour period under the conditions described.

2. The method as described in claim 1 in which a super-saturated atmosphere is maintained at least during part of the time cycle within the enclosed space.

3. The method as described in claim 1 in which the relative humidity of the atmosphere within the enclosed space is maintained at approximately 100%.

4. The method as described in claim 1 in which the Thamnidium is periodically introduced into the enclosed space in a glycerol suspension.

5. The method as described in claim 1 in which the atmosphere within the enclosed space is sterilized during the cooling period by periodically spraying a compound selected from the group consisting of propylene glycol and tributyl tin oxide into the enclosed space.

6. The method as described in claim 1 in which the atmosphere within the enclosed space is sterilized during the cooling period by periodically charging the air by means of electrostatic precipitation within the enclosed space.

7. The method as described in claim 1 in which the atmosphere within the enclosed space elevates the meat temperature from approximately 35° F. to approximately 75° F. in approximately four hours during the heating period and decreases the meat temperature from approximately 75° F. to approximately 35° F. in approximately four hours during the cooling period.

References Cited in the file of this patent
UNITED STATES PATENTS

| | | |
|---|---|---|
| 2,805,163 | Williams et al. | Sept. 3, 1957 |
| 2,816,836 | Williams | Dec. 17, 1957 |